Feb. 3, 1970   R. BROMBERG ET AL   3,493,177
METHOD OF AND MEANS FOR COOLING THE THROAT WALL OF
ROCKET ENGINE NOZZLE
Filed July 26, 1967
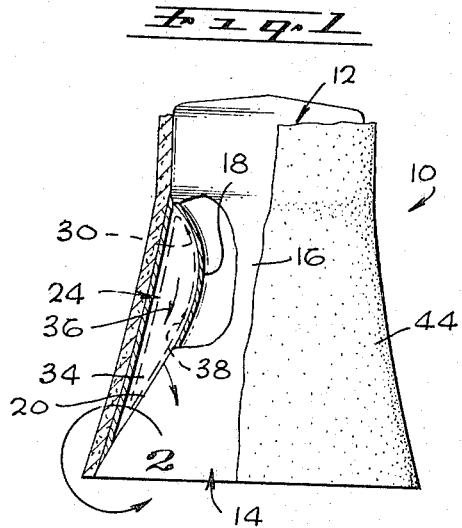
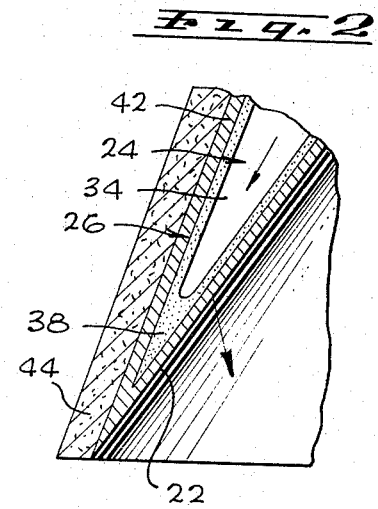
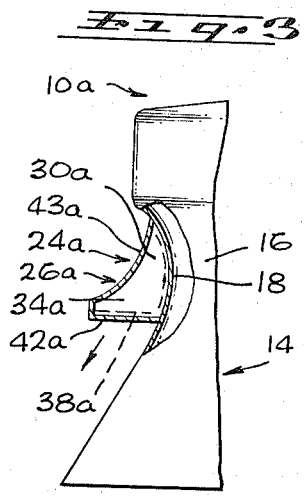
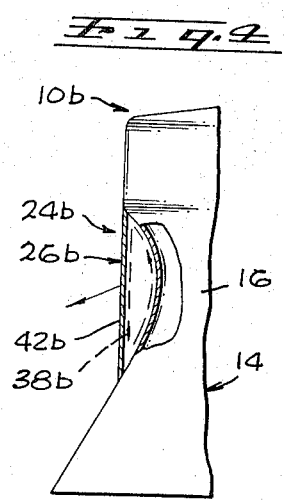
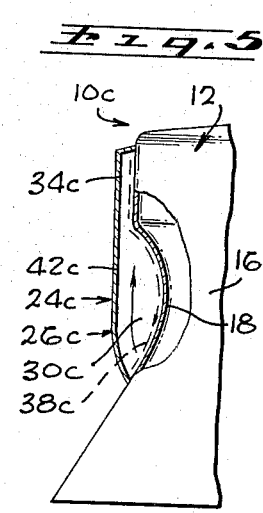
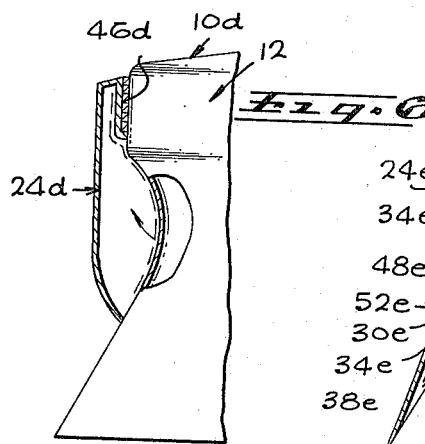
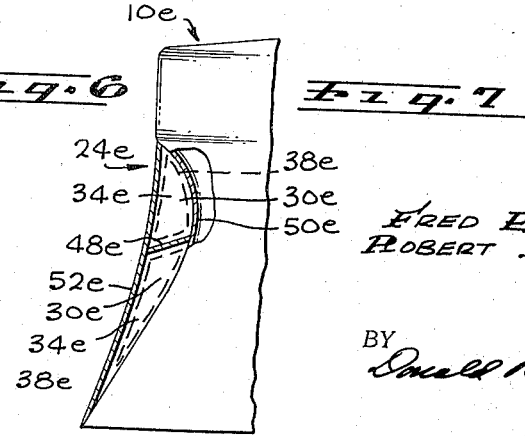
FRED E. ROMIE
ROBERT BROMBERG
INVENTORS
BY
Donald R. Nykagen
ATTORNEY United States Patent Office 3,493,177
Patented Feb. 3, 1970

3,493,177
METHOD OF AND MEANS FOR COOLING THE THROAT WALL OF ROCKET ENGINE NOZZLE
Robert Bromberg and Fred E. Romie, Palos Verdes Estates, Calif., assignors to TRW Inc., Redondo Beach, Calif., a corporation of Ohio
Filed July 26, 1967, Ser. No. 656,094
Int. Cl. B64c; B64d
U.S. Cl. 239—13                    15 Claims

ABSTRACT OF THE DISCLOSURE

A method of and means for cooling the throat wall of a rocket engine nozzle with the aid of a heat pipe surrounding the throat and containing a heat transfer fluid which undergoes a closed thermo-dynamic cycle involving vaporization of the fluid within an evaporator region of the pipe by heat absorption from the throat wall, flow of the resulting fluid vapor to a condenser region in the pipe, condensation of the vapor within the condenser region by rejection of its latent heat of vaporization to a heat sink, and capillary return flow of the liquid condensate to the evaporator region to repeat the cycle.

BACKGROUND OF THE INVENTION

Field of the invention

The invention relates generally to rocket engines and, more particularly, to a method of and means for cooling the throat wall of a rocket engine nozzle.

During operation of a rocket engine, its nozzle, and particularly the wall portion of the nozzle surrounding the nozzle throat, is subject to erosion by the high temperature propellant gases emerging through the nozzle. Such erosion, if it occurs, increases the throat area which, in turn, results in degradation of the engine performance. The present invention seeks to prevent such erosion by utilization of a unique and highly efficient heat transfer technique for cooling the nozzle throat wall.

Prior art

A variety of prior art heat transfer techniques have been devised for cooling rocket engine nozzles and particularly the nozzle throat walls. Patent No. 2,900,168 discloses a typical prior art fluid cooling system for rocket engine nozzles. The existing cooling systems of this type are characterized by excessive size and weight and other disadvantages which render such systems unsuitable for many rocket engine applications. A typical regenerative cooling system for rocket engines is disclosed in Patent No. 2,686,400. A major disadvantage of the existing regenerative cooling system is their heat flux and pressure loss limitations. The use of ablative materials to cool rocket engine nozzles is suggested in Patent No. 3,177,658. This technique, however, is not satisfactory for the reason that it requires discontinuities or openings in the nozzle throat wall.

SUMMARY OF THE INVENTION

The present invention proposes to cool the throat wall of a rocket engine nozzle with the aid of a heat transfer device or heat exchanger of the class that is commonly referred to as a heat pipe. The heat pipe is arranged in surrounding relation to the nozzle, in the region of its throat, in such a way that the evaporator region of the heat pipe is disposed in surrounding heat transfer relation to the nozzle throat wall and the condenser region of the pipe is disposed in heat transfer relation to a heat sink. Extending between these regions are capillary means for inducing flow of liquid heat transfer fluid from the condenser region to the evaporator region and a vapor flow path for conducting fluid vapor from the evaporator region to the condenser region. During operation of the rocket engine, the heat transfer fluid undergoes a closed thermodynamic cycle involving vaporization of the liquid fluid within the evaporator region of the heat pipe by heat absorption from the nozzle throat wall to cool the wall, flow of the resulting fluid vapor to the condenser region of the pipe, condensation of the vapor within the condenser region by rejection of its latent heat of vaporization to the heat sink, and capillary return flow of the liquid condensate to the evaporator region to repeat the cycle. Accordingly, to further refinements of the invention, the heat sink to which the latent heat of vaporization of the heat transfer vapor is rejected, to effect condensation of the vapor, may be furnished by the environmental heat sink surrounding the rocket engine in flight, a film cooled wall of the rocket engine combustion chamber, or regenerative cooling coils.

The primary advantage of the present technique of cooling a rocket engine throat wall resides in the fact that the evaporation and condensation process in the heat pipe occur at temperatures which typically differ by an order of 1°. The heat pipe thus transfers thermal energy at substantially uniform temperature from the throat wall and operates as a thermal conductor of effectively infinite thermal conductance.

BRIEF DESCRIPTION OF THE DRAWINGS

In the drawings:

FIG. 1 is an elevational view, partly in section, of a heat pipe cooled rocket engine according to the invention, wherein the latent heat of vaporization of the vaporized heat transfer fluid within the heat pipe is rejected, by radiation through the exit plane of the engine nozzle, to the environmental heat sink surrounding the engine in flight;

FIG. 2 is an enlargement of the area encircled by the arrow 2 in FIG. 1;

FIG. 3 is a fragmentary elevational view, partly in section, of a modified heat pipe cooled rocket engine according to the invention, wherein the latent heat of vaporization of the vaporized heat transfer fluid in the heat pipe is rejected to the environmental heat sink surrounding the rocket engine in flight by radiation from an axially presented radiator surface on the pipe;

FIG. 4 is a fragmentary elevational view, partly in section, of a further modified heat pipe cooled rocket engine according to the invention, wherein the latent heat of vaporization of the vaporized heat transfer fluid in the heat pipe is rejected to the environmental heat sink by radiation from a laterally presented radiator surface on the heat pipe;

FIG. 5 is a fragmentary elevational view, partly in section, of a further modified heat pipe cooled rocket engine according to the invention, wherein the latent heat of vaporization of the vaporized heat transfer fluid in the heat pipe is rejected to film cooled walls of the engine combustion chamber;

FIG. 6 is a fragmentary elevational view, partly in section, of a further modified heat pipe cooled rocket engine according to the invention, which utilizes a regenerative cooling technique involving rejection of the latent heat of vaporization of the vaporized heat transfer fluid in the heat pipe to regenerative cooling coils surrounding the engine combustion chamber; and FIG. 7 is a fragmentary longitudinal section through a further modified heat pipe cooled rocket engine according to the invention which is characterized by reduced acceleration induced resistance to capillary liquid flow through the engine heat pipe.

DESCRIPTION OF THE PREFERRED EMBODIMENTS

In general terms, the invention provides a heat pipe cooled rocket engine, represented in FIGS. 1 and 2 of the drawing, by the rocket engine 10, including a combustion chamber 12 and an exhaust nozzle 14 extending rearwardly from the combustion chamber. Nozzle 14 has a throat 16 bounded by an annular throat wall portion 18 of the nozzle and an expansion cone 20 parametrically bounded by a conical wall portion 22 of the nozzle. According to the present invention, the rocket engine is equipped with a heat pipe 24 for continuously transferring thermal energy from and thereby cooling the nozzle throat wall portion 18 during operation of the rocket engine. This heat pipe includes an annular casing 26 arranged in surrounding relation to and formed in part by the nozzle 14 in the region of its throat 16. Heat pipe casing 26 has a heat input section, which in this instance is provided by the nozzle throat wall 18, and an adjacent annular interior evaporator region 30 within the pipe. The heat pipe also has a heat rejection section, provided by the conical nozzle wall 2, which is disposed in heat transfer relation to a heat sink and an adjacent annular interior condenser region 34 in the pipe. Extending between the evaporator and condenser regions are a vapor flow space 36 and a capillary means 38.

Heat pipe 24 is adapted to contain a quantity of liquid heat transfer fluid and its vapor equal to or slightly in excess of that required to saturate the capillary means 38. The vapor flow space 36 of the heat pipe serves to conduct the fluid vapor from the evaporator region 30 to the condenser region 34 of the pipe. The capillary means 38 serves to conduct the liquid heat transfer fluid from the condenser region to the evaporator region. Briefly, during the operation of the rocket engine 10, the heat transfer fluid within the heat pipe 24 undergoes a closed thermodynamic cycle involving vaporization of the liquid fluid within the evaporator region 30 of the heat pipe by heat absorption from the nozzle throat wall or heat input section 18, flow of the resulting fluid vapor through the flow space 36 to the condenser region 34 of the pipe, condensation of the fluid vapor within the condenser region by rejection of its latent heat of vaporization to the heat sink, and capillary return flow of the liquid condensate through the capillary means 38 to the evaporator 30 to repeat the cycle. Thus, the heat pipe 24 is effective to continuously transfer heat from the nozzle throat wall 18 to the heat sink and thereby cool the wall. According to the present invention, the heat pipe is designed to have a heat transfer capability such that the nozzle throat wall is maintained at a temperature below that at which the wall will be melted or otherwise eroded by the high temperature propellant gases emerging through the nozzle.

As noted earlier, the latent heat of vaporization of the vaporized heat transfer fluid within the heat pipe 24 may be rejected to various heat sinks to effect condensation of the vapor. The heat pipes embodied in the rocket engines illustrated in FIGS. 1-4, for example, utilize as a heat sink the spatial environment surrounding the rocket engine in flight. The heat pipe cooled rocket engine illustrated in FIG. 5 utilizes, as the heat sink, film cooled walls of the rocket engine combustion chamber. Finally, the heat pipe cooled rocket engine shown in FIG. 6 employs a regenerative cooling process, wherein the latent heat of vaporization of the vaporized heat transfer fluid in the heat pipe is rejected to regenerative cooling coils surrounding the engine combustion chamber. Conceivably, a heat pipe cooled rocket engine according to the invention may utilize other heat sinks or the described heat sinks differently disposed.

Referring now in greater detail in FIGS. 1 and 2 of the drawings, the illustrated rocket engine, including its combustion chamber 12 and exhaust nozzle 14, is generally conventional and need not be explained in detail. Suffice it to say that the throat wall portion 18 of the engine nozzle 14 is annular in transverse section and has a generally concavo-convex configuration in axial section. The forward end of this throat wall portion joins the wall of the engine combustion chamber 12. The rear end of the throat wall portion merges with the conical wall portion 22 of the nozzle 14.

The heat pipe casing 26 has an inner wall which comprises the wall of the rocket nozzle 14 and an outer annular wall 42 which is welded or otherwise joined to the nozzle wall to form a hermetic enclosure. The outer wall 42 of the illustrated heat pipe casing 26 extends from the rocket engine combustion chamber 12 to the exit end of the nozzle wall and has a slight curvature in transverse section, as shown, such that this wall merges smoothly with the combustion chamber and nozzle walls to provide the rocket engine with a smoothly faired external configuration.

The capillary means 38 of the heat pipe 24 may comprise various capillary materials, such as fine mesh or micronic wire screen, wicking, or the like. This capillary material is applied in a relatively thin layer to the inner surfaces of the heat pipe casing 26 and may be secured to the casing walls 40, 42 in any convenient way. According to the preferred practice of the invention, the capillary material or layer covers the entire internal surface area of the casing. It will be understood that the capillary layer is disposed in direct contact with, and thereby in effective heat transfer relation to the casing walls.

In the particular rocket engine under consideration, the forward end of the heat pipe casing 26 surrounds the nozzle throat 16 and defines the evaporator section and interior evaporator region 30 of the heat pipe 24. The rear end of the heat pipe casing surrounds the nozzle exit cone 20 and defines the heat rejection section 32 and condenser region 34 of the heat pipe.

The heat pipe 24 is conditioned for cooling the rocket engine throat wall portion 18 by introducing into the interior of the pipe a quantity of heat transfer liquid, such as water or liquid metal, equal to or slightly in excess of that required to saturate the capillary layers 38 and then evacuating the air from the pipe. The heat pipe is then hermetically sealed. During operation of the rocket engine, heat flow occurs from the throat wall portion 18 of the nozzle 14 to the liquid heat transfer fluid contained by the inner capillary layer 38 within the adjacent evaporator region 30 of the heat pipe. This heat flow cools the throat wall and vaporizes the heat transfer liquid within the evaporator region. The resulting fluid vapor flows through the heat pipe vapor flow space 36 to the condenser region 34 of the pipe. The fluid vapor is then condensed by rejection of its latent heat of vaporization to the heat sink with which the heat pipe is designed to operate. In this instance, the heat sink is the environmental heat sink surrounding the rocket engine in flight, and rejection of the latent heat of vaporization of the heat transfer vapor occurs by initial conduction through the rear heat rejection section of the heat pipe casing, i.e., the conical wall portion 22 of the engine nozzle 14, and then by radiation from the inner surface of this nozzle wall portion of the heat sink through the exit plane of the nozzle. The liquid condensate enters the capillary layer 38 and is eventually returned, by capillary flow through the layer, to the evaporator region 30 of the heat pipe 24 to repeat the cycle.

It is evident at this point, therefore, that during operation of the rocket engine, the heat transfer fluid within the heat pipe 24 undergoes a closed thermodynamic cycle involving vaporization or boiling of the liquid heat transfer fluid within the evaporator region 30 of the heat pipe by heat absorption from the throat wall portion 18 of the engine nozzle 14, flow of the resulting fluid vapor through the flow space 36 to the condenser region 34 of the pipe, condensation of the fluid vapor in the condenser region by radiation through the nozzle exit plane to the environmental heat sink, and capillary return flow of the liquid condensate to the evaporator region to repeat the cycle.

Thus, the heat pipe 24 is effective to continuously transfer heat from the throat wall portion 18 of the rocket engine nozzle 14 to the environmental heat sink and thereby continuously cool the throat wall portion. According to the present invention, the heat pipe is designed to have sufficient heat transfer capability to maintain the throat wall portion below the temperature at which the inner surface of this wall portion will be melted or otherwise eroded by the high temperature propellant gases emerging through the nozzle. In most cases, the thermal resistance of the heat pipe wall and capillary layers will greatly exceed the effective thermal resistance associated with the evaporation and condensation processes. However, the wall-capillary layer resistance may be minimized by keeping the heat pipe wall and the capillary layer relatively thin.

In FIG. 1, it is assumed that the outer envelope temperature of the rocket engine is limited for some reason. In this case, the heat pipe is surrounded by a thermal radiation shield or insulation 44. If the envelope temperature of the engine is not limited, such radiation shields or other insulation may be omitted, in which case the outer wall 42 of the heat pipe casing 26 may be utilized as a radiator surface from which a portion of the latent heat of vaporization of the fluid vapor in the heat pipe may be radiated to the environmental heat sink, thus, to further reduce the operating temperature.

The heat pipes embodied in the modified, heat pipe cooled rocket engine configurations of FIGS. 3–6 are functionally identical to and serve the same basic purpose as the heat pipe embodied in the engine configuration, just described, and differ only in their respective geometries, in the methods by which they reject the latent heat of vaporization of the heat transfer vapor in the heat pipes to the heat sink, and, in some cases, in the type of heat sink which is employed. Accordingly, a detailed description of the modified heat pipe cooled rocket engine configurations is unnecessary. Suffice it to say that the engine configuration 10a of FIG. 3 embodies a heat pipe 24a which surrounds substantially only the throat 16 of the engine nozzle 14. This heat pipe has a generally toroidal casing 26a defining a chamber of generally triangular shape in axial section bounded by annular sidewalls 42a, 43a which are welded or otherwise hermetically joined along their meeting edges to one another and along their inner edges to the nozzle wall. Casing wall 42a extends radially out from and is disposed in a plane substantially normal to the axis of the engine nozzle 14. The nozzle wall and the casing wall 42a define, respectively, the evaporator section and the condenser section of the heat pipe. The heat pipe 42a under consideration has a capillary layer 38a which extends between its interior evaporator and the condensor regions 30a, 34a and covers the inner surfaces of the heat input and rejection sections. In this instance, the rearwardly presented surface of the casing wall 42a provides a radiator surface.

During operation of the rocket engine, the heat transfer fluid within the heat pipe 24a undergoes essentially the same closed thermodynamic cycle described earlier. Thus, this cycle involves vaporization of the liquid heat transfer fluid within the evaporator region 30a of the heat pipe by heat absorption from the nozzle throat wall portion 18, flow of the resulting vapor from the evaporator region to the condenser region 34a, rejection of the latent heat of vaporization and resultant condensation of the vapor within the condenser region by radiation from the outer surface of the heat pipe casing wall 42a directly to the environmental heat sink, and return of the liquid condensate to the evaporator region by capillary flow through the capillary layer 38a.

The modified heat pipe cooled rocket engine configuration 10b illustrated in FIG. 4 has a heat pipe 24b with a hermetic casing 26b which surround the throat 16 of the engine nozzle 14 and includes an outer wall 42b which is joined along its front and rear edges to the nozzle wall to form a hermetic enclosure. The nozzle wall forms the heat input section of the heat pipe. The outer wall 42b is generally cylindrical and forms the heat rejection section of the heat pipe. The outer, radially presented surface of this outer wall provides a radiator surface. In this case, the heat pipe is equipped with a capillary layer 38b which covers the inner surfaces of the casing walls. Operation of the modified engine configuration of FIG. 4 is essentially identical to that of FIG. 3, except that the latent heat of vaporization of the heat transfer vapor within the heat pipe 24b is rejected to the environmental heat sink by radiation from the radially presented surface of the heat transfer casing wall 42b.

Turning now to FIGS. 5 and 6, there are illustrated modified heat pipe cooled rocket engine configurations according to the invention, wherein the heat sink for the engine heat pipes is furnished by cooling means embodied in the engine system. In the engine 10c of FIG. 5, for example, the cooling means comprise film cooled walls of the engine combustion chamber 12. The heat pipe 24c of the engine surrounds the combustion chamber and the throat 16 of the engine nozzle 14. This heat pipe has a casing 26c including an outer wall 42c which is welded or otherwise hermetically joined to the engine combustion chamber and nozzle throat walls as shown. The rear end of the casing which surounds the nozzle throat 16 forms the heat input section and evaporator region 30c of the heat pipe. The front end of the casing which surrounds the film cooled wall of the combustion chamber 12, forms the heat rejection section and condenser region 34c of the heat pipe. The heat pipe 24c is equipped with a capillary layer 38c.

During operation of the rocket engine under consideration, the heat transfer fluid within the heat pipe 24c undergoes a closed thermodynamic cycle involving vaporization of the liquid fluid transfer fluid within the evaporator region 30c of the heat pipe by heat absorption from the nozzle throat wall portion 18, flow of the resulting fluid vapor forwardly through the heat pipe to the forward condenser region 34c, condensation of the vapor in the condenser region by rejection of its latent heat of vaporization to the film cooled walls of the engine combustion chamber 12, and rearward return flow of the liquid condensate to the evaporator region 30c through the capillary layer 38c. It is evident, therefore, that the heat pipe 24c operates to continuously transfer thermal energy from the throat wall 18 of the rocket engine nozzle 14 to the film cooled wall of the engine combustion chamber 12 and thereby cool the throat wall.

The heat pipe cooled rocket engine configuration 10d illustrated in FIG. 6 is essentially identical to that illustrated in FIG. 5. In FIG. 6, however, the combustion chamber cooling means which provide the heat sink for the engine cooling heat pipe 24d comprise regenerative cooling coils 46d which, in this instance, surround the engine combustion chamber 12. It will be understood, however, that the regenerative cooling coils may be otherwise located. The cooling action of the heat pipe is essentially the same as that described in connection with FIG. 5 and, therefore, need not be explained in detail. One advantage of the regenerative heat pipe cooling system of FIG. 6, however, resides in the fact that if, at part thrust, the increase in bulk coolant temperature exceeds the permissible values, an inert gas may be utilized to blanket the upper portion of the regenerative cooling coils to decrease the effective coil heat transfer area and hence the coolant temperature rise. An additional advantage of the heat pipe cooled engine configurations of both FIGS. 5 and 6 resides in the fact that they eliminate the heat flux and pressure loss limitations which are encountered in most, if not all, conventional regenerative cooling systems.

Of significant note in connection with FIGS. 5 and 6 is the fact that capillary flow of the liquid heat transfer fluid from the condenser region to the evaporator region occurs in a rearward direction relative to the rocket engine, whereby the acceleration force produced on the heat transfer liquid by the forward thrust of the rocket engine aids capillary flow of the liquid. In this regard, it will be observed that in the heat pipe cooled rocket engine configurations in FIGS. 1–4, acceleration forces inhibit capillary flow of the liquid heat transfer fluid from the condenser regions to the evaporator regions of the heat pipes. FIG. 7 illustrates a modified heat pipe cooled rocket engine 10e wherein acceleration induced resistance to capillary liquid flow is reduced by providing the engine heat pipe 24e with an internal wall 48e transverse to the rocket axis. This wall divides the heat pipe into two separate annular hermetic enclosures or chambers each containing an evaporator region 30e adjacent the heat input section 50e of the heat pipe, a condenser region 34e adjacent the heat rejection section 52e of the pipe, and a capillary structure 38e extending between these regions. In this case, heat flow occurs from the rocket engine nozzle wall, through the heat pipe chambers in parallel, to the heat rejection section of the heat pipe, and is then radiated from the heat rejection section in such a way that the heat transfer fluid in each chamber undergoes the same thermodynamic heat transfer cycle described earlier. The major advantage of this arrangement is that the effective height of the capillary liquid columns in the heat pipe chambers parallel to the rocket axis is reduced relative to the column height which would exist if the inner heat pipe wall 48e were eliminated. Accordingly, the hydrostatic pressure differential created in the liquid heat transfer fluid within the chambers during acceleration, and hence the acceleration induced resistance to capillary liquid flow through the chambers, are reduced.

It is now evident, therefore, that the invention herein described and illustrated is fully capable of attaining the several objects and advantages preliminary set forth.

The embodiments of the invention in which an exclusive property or privilege is claimed are defined as follows:

1. In a rocket engine, the combination comprising:
   an exhaust nozzle having a throat bounded by a throat wall portion;
   a heat pipe for transferring thermal energy from said throat wall portion to a heat sink and thereby cooling said wall portion during engine operation, said heat pipe including a hermetic casing mounted on said nozzle and containing an evaporator region adjacent and disposed in heat transfer relation to said throat wall portion, a condenser region disposed in heat transfer relation to said heat sink, a vapor flow space communicating said regions, and capillary means extending between said regions; and
   said heat pipe being adapted to contain a heat transfer vapor and its condensed phase present in the amount required to saturate said capillary means, whereby during rocket engine operation, the heat transfer fluid in said heat pipe undergoes a closed thermo-dynamic cycle involving vaporization of the liquid fluid within said evaporator region by heat absorption from said throat wall portion, flow of the resulting vapor through said flow space to said condenser region, condensation of the vapor within the condenser region by rejection of its latent heat of vaporization to heat sink, and capillary return flow of the liquid condensate through said capillary means to said evaporator region to repeat the cycle.

2. In a rocket engine, the combination comprising:
   an exhaust nozzle having a throat bounded by an annular throat wall portion;
   a heat pipe for transferring thermal energy from said throat wall portion to a heat sink and thereby cooling said wall portion during engine operation, said heat pipe including an annular hermetic casing surrounding said nozzle throat and containing an evaporator region adjacent and disposed in heat transfer relation to said throat wall portion, a condenser region disposed in heat transfer relation to said heat sink, a vapor flow space communicating said regions, and capillary means extending between said regions; and
   said heat pipe being adapted to contain a heat transfer vapor and its condensed phase present in the amount required to saturate said capillary means, whereby during rocket engine operation the heat transfer fluid in said heat pipe undergoes a closed thermodynamic cycle involving vaporization of the liquid fluid within said evaporator region by heat absorption from said throat wall portion, flow of the resulting vapor through said flow space to said condenser region, condensation of the vapor within said condenser region by rejection of its latent heat of vaporization to said heat sink, and capillary return flow of the liquid condensate through said capillary means to said evaporator region to repeat the cycle.

3. A rocket engine combination according to claim 2, wherein:
   said heat sink is the environmental heat sink surrounding said engine during flight;
   said nozzle has an expansion cone bounded by a conical wall portion and terminating at the nozzle exit plane; and
   said condenser region of said heat pipe is disposed in heat transfer relation to said conical wall portion for rejection of the latent heat of vaporization of the vapor within said condenser region by radiation from the inner surface of said conical wall portion through said nozzle exit plane.

4. A rocket engine combination according to claim 3, wherein:
   said heat pipe further comprises an exterior radiator surface disposed in heat transfer relation to said condenser region for additional rejection of the latent heat of vaporization of the vapor in said condenser region to said heat sink by thermal radiation from said latter surface.

5. A rocket engine combination according to claim 2, wherein:
   said heat sink is furnished by the environmental heat sink surrounding said rocket engine in flight; and
   said heat pipe further comprises an exterior radiator surface disposed in heat transfer relation to said condenser region for heat rejection of the latent heat of vaporization of the vapor within said condenser region by thermal radiation from said radiator surface to said environmental heat sink.

6. A rocket engine combination according to claim 5, wherein:
   said radiator surface surrounds said engine nozzle in a plane substantially normal to the axis of said nozzle and faces rearwardly relative to said nozzle.

7. A rocket engine combination according to claim 5, wherein:
   said radiator surface surrounds said nozzle and faces radially away from said nozzle.

8. A rocket engine combination according to claim 2, wherein:
   said rocket engine includes cooling means which comprise said heat sink; and
   said condenser region of said heat pipe is disposed in heat transfer relation to said cooling means.

9. A rocket engine combination according to claim 8, wherein:
   said cooling means comprise regenerative cooling coils.

10. A rocket engine combination according to claim 2, wherein:
    said heat sink comprises film cooled walls of said combustion chamber.

11. A heat pipe for cooling the annular throat wall portion of a rocket engine nozzle, said heat pipe comprising:

an annular hermetic casing for surrounding the throat of said nozzle and including annular walls defining an annular hermetic chamber;

said casing having an inner wall portion forming the heat input section of said casing to be disposed in heat transfer relation to said nozzle throat and another wall portion forming the heat rejection section of said casing to be disposed in heat transfer relation to a heat sink;

said heat pipe chamber having an evaporator region disposed in heat transfer relation to said heat input section, a condenser region disposed in heat transfer relation to said heat rejection section, and a vapor flow space communicating said regions;

capillary means extending between said regions and having portions disposed in heat tarnsfer relation to said sections; and said heat pipe being adapted to contain a heat transfer vapor and its condensed phase present in the amount required to saturate said capillary means, whereby when said heat pipe is installed on an operating rocket engine, the heat transfer fluid in said heat pipe undergoes a closed thermodynamic cycle involving evaporation of the liquid fluid within said evaporator region by heat absorption from said nozzle throat, flow of the resulting vapor within said condenser region by rejection of its latent heat of vaporization to said heat sink, and capillary return flow of the liquid condensate through said capillary means to said evaporator region to repeat the cycle.

12. In a rocket engine, a combination comprising:
an exhaust nozzle;
a heat pipe for transferring thermal energy from the wall of said nozzle to heat sink and thereby cooling said nozzle wall during engine operation, said heat pipe including a hermetic casing mounted on said nozzle, a wall within and sealed to said casing and dividing the interior said casing into separate hermetic chambers spaced along the nozzle axis, and each chamber containing an evaporator region adjacent and disposed to heat transfer relation to said nozzle wall, a condenser region disposed in heat transfer relation to said heat sink, a vapor flow space communicating said regions, and capillary means extending between said regions; and each said heat pipe chamber being adapted to contain a heat transfer vapor and its condensed phase present in the amount required to saturate the capillary means in the respective means, whereby during rocket engine operation, the heat transfer fluid in each chamber undergoes a closed thermodynamic cycle involving vaporization of the liquid fluid within the evaporator region of the respective chamber by heat absorption from the nozzle wall, flow of the resulting vapor through the vapor flow space to said condenser region of the respective chamber, condensation of the vapor within the respective condenser region by rejection of its latent heat of vaporization to said heat sink, and capillary return flow of the liquid condensate through the capillary means to said evaporator region of the respective chamber to repeat the cycle.

13. A rocket engine combination according to claim 12, wherein:
said casing and said casing wall are annular in shape and surround said nozzle.

14. A heat pipe for cooling the annular throat wall portion of a rocket engine nozzle, said heat pipe comprising:

an annular hermetic casing for surrounding the throat of said nozzle and including an internal annular wall sealed to said casing and dividing the interior of said casing into separate axially spaced hermetic chambers;

said casing having a radially inner annular heat input section to be disposed in heat transfer relation to said nozzle throat, and an annular heat rejection section to be disposed in heat transfer relation to a heat sink;

each said heat pipe chamber containing an evaporator region disposed in heat transfer relation to said heat input section, a condenser region disposed in heat transfer relation to said heat rejection section, and a vapor flow space communicating said regions;

capillary means extending between said regions of each chamber and having portions disposed in heat transfer relation to said heat input and rejection sections, respectively; and each said heat pipe chamber being adapted to contain a heat transfer vapor and its condensed phase present in the amount required to saturate the capillary means in the respective chamber, whereby once a heat pipe is installed on an operating rocket engine, the heat transfer fluid in each chamber undergoes a closed thermodynamic cycle involving evaporation of the liquid fluid within said evaporator region of the respective chamber by heat absorption from said nozzle throat, flow of the resulting vapor through the flow space to said condenser region by rejection of its latent heat of evaporation to said heat sink, and capillary return flow of the liquid condensate through the capillary means to said evaporator region of the respective chamber to repeat this cycle.

15. The method of continuously cooling the throat wall of a rocket engine nozzle which comprises the steps of:
passing a liquid heat transfer fluid through an evaporator region disposed in heat transfer relation to said wall to effect vaporization of said liquid by heat absorption from said wall;

inducing flow of the resulting fluid vapor from said evaporator region to a condenser region disposed in heat transfer relation to a heat sink, thereby to effect condensation of said vapor within said condenser region by rejection of its latent heat of vaporization to said heat sink; and inducing capillary return flow of the resulting liquid condensate from said condenser region to said evaporator region.

References Cited
UNITED STATES PATENTS

| | | | | |
|---|---|---|---|---|
| 3,137,132 | 6/1964 | Turkat | | 239—127.1 |
| 3,157,026 | 11/1964 | Lampert | | 239—127.1 |
| 3,251,554 | 5/1966 | Kraus | | 239—127.1 |

EVERETT W. KIRBY, Primary Examiner

U.S. Cl. X.R.
236—127.1, 265.15